April 5, 1955     H. M. JACKLIN     2,705,478
INTERNAL COMBUSTION ENGINE
Filed Jan. 12, 1953
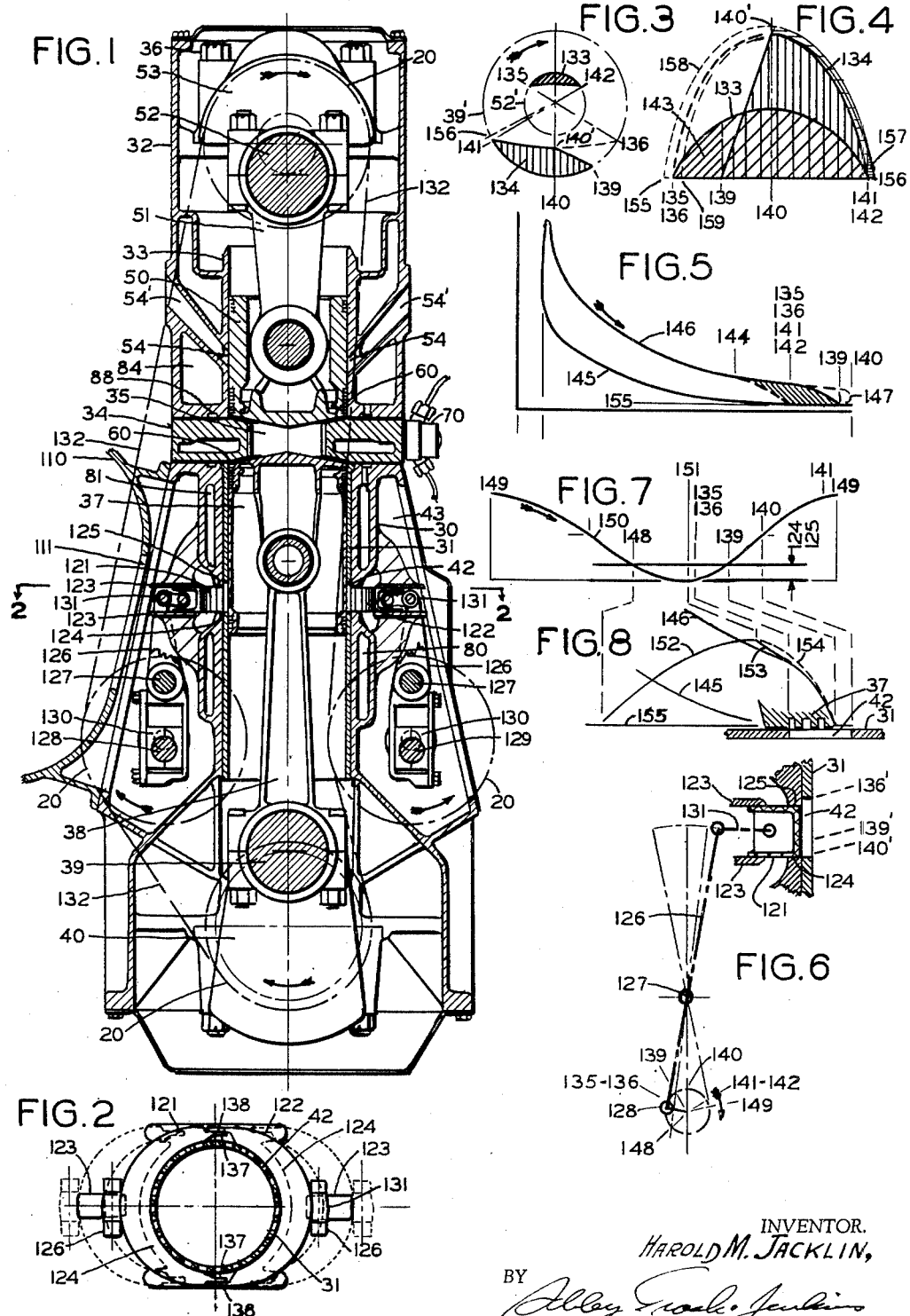
INVENTOR.
HAROLD M. JACKLIN,
BY
ATTORNEYS

United States Patent Office 2,705,478
Patented Apr. 5, 1955

2,705,478

INTERNAL COMBUSTION ENGINE

Harold M. Jacklin, Ada, Ohio

Application January 12, 1953, Serial No. 330,647

7 Claims. (Cl. 123—51)

This invention relates to two-stroke cycle engines and is disclosed herein as applied to engines employing unidirectional or uniflow scavenging and using two pistons in each cylinder. In such an engine, the two pistons in each cylinder generally reciprocate oppositely, one uncovering exhaust ports and the other uncovering inlet ports as the outer ends of the respective strokes are approached. Thus, the new charge traverses the whole cylinder while displacing from the cylinder the products of combustion formed during the previous cycle of operation. The invention is not limited to engines employing uniflow scavenging.

The objects of my invention are:

1. To obtain the desired timing of events while still having the two opposed cranks of a uniflow engine in or near an exact phase relationship in order to simplify the problem of balancing the inertia forces along the cylinder axis so that the effect thereof at the engine mount is eliminated or reduced substantially.

2. To provide for relatively short transfer events, thus enabling greater use of the engine cylinder than possible by other means.

3. To prevent the blow-back of spent cylinder gases into the air-box or mixture supply chamber and consequent vitiating of the new charge of air or mixture therein.

4. To enable the extension of the expansion and blowdown of gases during the working stroke to more than ninety per cent thereof, with a resultant increase in the work from the cylinder, with no increase in the quantity of fuel used therein, thus increasing the economy of operation.

In carrying out the invention in its preferred form, each cylinder is provided with a pair of opposed pistons, hereinafter referred to as the inlet and exhaust pistons. The stroke of the inlet piston is substantially greater than that of the exhaust piston, conveniently two to three times as great. The two cranks which control the motions of the pistons through suitable connecting rods are interconnected as by a suitable gear or sprocket and chain train so that the two piston-rod-crank trains are in or near a complete phase relationship, i. e., they both are in or near the inner or outer dead-center positions or close thereto at the same instant. Both the inlet and exhaust ports in the cylinder wall are uncovered and covered at the same or nearly the same instant by their respective pistons, such as, say, fifty-five degrees before and after the outer dead center. Since, at the instant of uncovering the gas pressure in the cylinder is generally two to four times greater than that in the air-box or mixture supply duct, I provide an additional valve to prevent the flow of spent cylinder gases into the air-box. Such flow of spent gases into the air-box would vitiate the air or mixture therein so that an excessively large quantity of air must then be pumped through the cylinder to insure maximum output. This, in turn, would require the enlargement of the ports, reducing the effectiveness of the cylinder and increase the power required to supply the air. The preferred valve mechanism comprises two similar crescent-shaped parts or valves reciprocable transversely to the cylinder and in the air-box so that they can trap a small amount of air and compress it into the inlet ports while the ports are still covered by the inlet piston. The crescent shape is adopted so that, when brought together, the two will fit closely about the inlet port-belt of the cylinder and serve to effectively prevent the flow of spent gases into the air-box when the top ring on the piston uncovers the inlet ports and thereafter until the pressure in the cylinder drops to or below that in the air-box by the relief afforded because of the flow of spent gases out of the cylinders through the exhaust ports in the exhaust cylinder. Then, these crescent shaped parts are withdrawn rapidly from the port-belt and the air flows past them and through the ports into the cylinder. The crescent valves are arranged to move between two close-fitting guides having suitable openings and lands so that the inner edges of the crescent valves are masked during the valve-compression period and until the inlet proper is desired. In addition, the crescents are provided with extensions or ears that overlap during the "masked" period.

Preferably, the engine comprises a lower block containing the inlet end of each cylinder, an upper block containing the exhaust end of the cylinder, and an interposed head in which a small-diameter combustion chamber is provided as in my previous application filed October 6, 1950, Serial No. 188,810.

The accompanying drawings illustrate the invention:

Fig. 1 is a transverse section through an engine on the center-line of one cylinder;

Fig. 2 is a plan view illustrating the crescent valves and part of their action;

Figs. 3 and 4 are diagrams illustrating the possible porting or valving events;

Fig. 5 is an indicator diagram involving the pressure-volume relationships in the cylinder and showing the area added by the adoption of this invention;

Fig. 6 is a diagrammatic illustration of one suitable mechanism for actuating the crescent valves;

Fig. 7 is a displacement diagram for the crescent valves with the mask effect; and Fig. 8 is a diagram showing the pressure effects in the ports before and during the blow-down period in reference to the pressure within the cylinder.

The engine shown in Fig. 1 embodies a lower block 30 having one or more inlet cylinders 31, an upper block 32 having a corresponding number of exhaust cylinders 33, and a head 34 which is interposed between the two blocks and which is provided with a small-diameter combustion chamber 35 in line with each pair of inlet and exhaust cylinders. Any appropriate form of means, such as through-bolts 36, may be used to hold the two blocks and the head in assembled relationship.

Each inlet cylinder contains an inlet piston 37 connected by a connecting rod 38 to a crank 39 of a lower crank shaft 40. In a position to be uncovered by the head of the piston 37 as it nears the outer end of its stroke, the cylinder 31 is provided with inlet ports 42 which, as will be clear from Fig. 2, are directed tangentially so that the gases entering the cylinder through them will create a circular motion within the cylinder. This block contains an air-box or reservoir 43 to which air or gas mixture is supplied through the opening 111, in this case from a blower, a part of the housing 110 of which is shown.

Each exhaust cylinder 33 is aligned with an inlet cylinder 31 and contains a reciprocable piston 50 connected through a connecting rod 51 with a crank pin 52 of an upper crank shaft 53. The stroke of the upper piston 50 is considerably less than that of the lower piston 37, preferably being about one-third to one-half of the stroke of the lower piston 37, in order to have a high scavenging efficiency. In a position to be uncovered by the head of piston 50 as it nears the outer end of its stroke, the cylinder 33 is provided with an annular series of exhaust ports 54 opening into the expanding-nozzle like exhaust passages 54'.

The combustion chamber 35 in the head 34 is of smaller diameter than the cylinders 31 and 33 to provide annular shoulders 60 which are closely approached by the pistons 37 and 50 at the inner ends of their strokes. The head is provided with one or more fuel injection nozzles 70.

As so far described, the engine is very similar to that shown and described in my aforesaid copending application. In this case, the crank shafts 40 and 53 are interconnected by a chain 132 which meshes with equal-diameter sprockets 20 provided on the two crank shafts and also on two ecentric shafts 128 and 129 forming part of the valving mechanism to be hereinafter described.

If, as shown, the two crank shafts are in phase with each other, if the weights of pistons 37 and 50 are inversely as their strokes, and if the ratios of the lengths of the connecting rods 38 and 51 to their respective crank throws are equal, the inertia forces set up due to the weights reciprocating in the cylinders 31 and 33 will be equal and will act oppositely at all positions of the cranks 39 and 52. Thus, there will be no shaking forces active because of the reciprocating masses. If, however, the ratio of the length of connecting rod 51 to its crank 52 throw is greater than that of the length of connecting rod 38 to its crank 39 throw, there will be a small unbalanced variable harmonic force acting along the cylinder axis at twice crank speed. With the pistons in the position shown, this force will be at a maximum and directed upward. With the cranks at ninety degrees, the force will again be at a maximum and directed downward, while, with the pistons at their outer dead center positions the force will again be at a maximum and be directed upward. In a two cylinder engine with the cranks at one-hundred-eighty degrees, the axial shaking force will be double that in a single cylinder engine. In a three cylinder engine with the cranks at one-hundred-twenty degrees, the harmonic forces acting in cylinder axes 1 and 3 will set up a rocking couple while that acting in cylinder number 2 axis will shake the whole engine vertically. In a four cylinder engine, arranged to fire 1-3-4-2 or 1-2-4-3, the harmonic forces acting in the several cylinders will form equal and opposite couples and reactions so that the engine will be balanced. Likewise, in a six cylinder engine firing 1-5-3-6-2-4, 1-4-2-6-3-5, 1-3-5-6-4-2, 1-2-4-6-5-3, 1-2-3-6-5-4, or 1-4-5-6-3-2, the axial harmonic forces in the several cylinders again will form equal and oppositely acting couples and reactions so that the engine will be balanced.

If, now, the two cranks are moved out of phase by but a few degrees, i. e., for example the exhaust crank pin 52 is moved ahead of the inlet crank pin 39 by only 5 to 10 degrees, the reciprocating masses being properly proportioned in the two opposed cylinders, the resultant unbalanced inertia force acting in the axis of the cylinders may be kept very low. Such an ararngement may be desirable to obtain certain valving characteristics as will be explained later.

The valving mechanism above referred to, comprises a pair of crescent-shaped valves 121 and 122 adapted to complement each other and form a ring embracing the inlet cylinder and occluding the inlet ports 42. As shown, the valves are supported for radial reciprocation in guides 123 spaced outwardly from the inlet cylinder and reciprocate into and out of the space between two masking shoulders 124 and 125 (Fig. 6) constituting the lower and upper edges of an annular groove which surrounds the cylinder and communicates freely with the inlet ports 42. At the outer ends of their strokes the valves 121 and 122 are withdrawn from between the shoulders 124 and 125 to permit communication between the air box 43 and the ports 42, but at the inner ends of their strokes they prevent such communication. To increase their effectiveness in closing the ports 42, the valves may be provided with overlapping end portions 137 and 138 (Fig. 2).

The valves 121 and 122 are connected by the short links 131 to the rockers 126 pivoted at 127. The rockers 126 are actuated, in the engine shown, by duplicate eccentrics 128 and 129 rotated in opposite directions and through the blocks 130 sliding in the guide space provided in the rockers 126. The valves are reciprocated in opposite directions and in phase, so that all forces set up as a consequence of their operation are balanced and therefore cannot become apparent at the engine mountings.

Fig. 2 shows, in the heavy lines, the valves 121 and 122 at their inmost positions—almost touching the cylinder 31, covered by the mask shoulders 124 and 125, and with the ears 137 and 138 lapping over one another to form a full seal between the ports and the air box 43. The dotted outlines of the crescents 121 and 122 show them when pulled away from the cylinder 31 when gas may flow between the tips of the ears 137 and 138 and over and under the valves and over the masks 124—125 into and through the ports 42 into the cylinder 31 when the piston 37 does not cover the ports 42. If the valves 121 and 122 are moved from the dotted line positions toward the cylinder 31, the inner edges thereof will trap a small quantity of gas when they reach the edges of the masks 124—125, with the ears 137 and 138 telescoping one another at the same time. Continued motion to the full-line or inmost position will compress this trapped gas into the ports when the piston 37 has the ports 42 covered at the inside of cylinder 31.

In Fig. 3, the circles 39' and 52' represent the paths of the cranks 39 and 52. The exhaust ports 54 are uncovered at 135 and again covered at 142, the height of the shaded area 133 representing the aggregate area of the uncovered portions of the exhaust ports. The inlet ports 42 are uncovered at 136 and again covered at 141. However, at point 136, the valves 121 and 122 are between the shoulders 124 and 125 and close to the cylinder 31 with the result that the inlet ports, although uncovered by the piston 37, do not communicate with the air box. Later in the power stroke, or at point 139, the valves 121 and 122 are moved rapidly out from between the shoulders 124 and 125, thus effectively opening the inlet ports. The point at which the valves cease to restrict the effective area of the inlet ports is indicated at 140. The height of the shaded area 134 represents the effective aggregate area of the inlet ports as controlled jointly by the valves 121 and 122 and the piston 37. The respective heights of the areas 133 and 134 are relative; the aggregate area of the fully open inlet ports is considerably greater than that of the fully open exhaust ports.

Fig. 4 superposes the exhaust and inlet events, effective port-area ordinates being plotted against crank angle. The reference numerals 133, 134, 135, 136, 139, 140, 141, and 142 have the same significance as in Fig. 3. The exhaust event (133) is represented by the obliquely cross-hatched area, while the inlet event (134) is represented by the vertically cross-hatched area, both such areas being bounded by full lines. The finely cross-hatched area 143 represents the blow-down period during which no flow into or out of the air-box 43 can occur through the ports 42 because of the use of the valves 121 and 122 and the gases flow out the exhaust at a high velocity lowering the pressure in the cylinder to a value near that in the air box. With the pressure reduced in the cylinders at point 139, the valves 121 and 122 proceed to provide a rapidly increasing area for inlet up to point 140' when the ports 42 and the piston 37 take over to point 141. From point 139 to point 141, new gas or air enters the cylinder 31 and passes upward through the combustion chamber 35 into (and some on through) cylinder 33. The area occupied by the fine vertical cross-hatching in Fig. 4 represents the excess of inlet area over the exhaust area and is, ordinarily, called a supercharging area. The expanding-nozzle form of the exhaust passages 54' and the aspirating effect of the exhaust gas slug passing further along in the exhaust passage beyond 54' serve to render the smaller time-area in the exhaust ports completely effective along with the pressure in the air-box 43 to evacuate the whole of the spent gas from the cylinders and the combustion chamber and replace it with a new charge of gas or air to use in the succeeding compression and expansion strokes.

In the operation of the engine as so far described, it has been assumed that the crank-shafts are in phase and that the inlet and exhaust ports are simultaneously covered and uncovered. Higher supercharging can be obtained by delaying, as until the point 156 (Figs. 3 and 4) the covering of the inlet ports by the piston 37. This can be done in either of two ways. First, the upper edges of the inlet ports may be raised while keeping the crank shafts in phase. This will delay inlet closing, but need not result in an earlier intake opening, because the inlet ports can be closed by the valves 121 and 122 while they are uncovered by the piston 37. This will add to the intake event the time-area represented by horizontal cross-hatching in Fig. 4, since the aggregate area of the uncovered portions of the inlet ports will be represented by the curve 158.

Another method of deferring inlet closing to the point 156 is to retard the crank 39 by the angle between points 142 and 156 (Fig. 4), in which case the inlet ports 42 will be uncovered by the piston 37 at point 159, the angular distance between points 136 and 159 being equal to the angular distance between points 142 and 156. In this case, the whole of curve 134 is displaced to the right with line 139—140' remaining substantially as shown.

In Fig. 5, three possible diagrams appear showing the pressure (ordinate) and the volume (abscissae) relationships for the conventional two and four stroke engines and for the engine here proposed. The compression line 145 is common to all the engines. In the expansion line 146 the variations are as follows: (*a*) in the conventional two-stroke engine, the exhaust ports open at point 144 and the blow-down period is completed at 135, (*b*) in the four-stroke engine the exhaust valves are opened at a point close to 135 but, since poppet exhaust valves must be opened slowly, little flow therethrough results and the pressure follows the toe-line 147, (*c*) in the two-stroke engine of my invention, the exhaust opens at point 135 and the blowdown event is completed at point 139.

Since the area between the compression 145 and expansion 146 lines is in terms of pressure-volume, it represents work. The cross-hatched area extending from point 144 to point 139 represents additional work realized in the cylinder of my engine over that realized from the cylinder of the conventional two-stroke engine, while the clear area inclosed at the toe by line 147 shows the further additional work realized in the cylinder of four-stroke engines.

Fig. 6 is a diagrammatic view of the mechanism selected for illustration herein to actuate each of the valves 121 and 122. Point 127, the pivot for the rocker 126, is fixed. As shown, the valve 121 is at its inmost point almost touching the cylinder 31, and has formed a seal over the masks 124—125, with the eccentric 128 radius forming a right angle with the axis of the rocker 126. As the eccentric 128 proceeds clockwise it reaches, successively, points 135—136, 139, 140, and 141—142 corresponding to the same numbered points in Figs. 3, 4, 5, 7, and 8. As the eccentric 128 reaches point 148 the valve 121 will again start to cover the masks 124—125 and its ears 137 will be met by the ears 138 of the valve 122, which has, of course, been actuated in the same manner on the opposite side of the cylinder by its eccentric 129. It is apparent that the out-stroke of the valve 121 is accomplished between the position shown for eccentric 128 and point 149 and requires less time than the in-stroke between point 149 and the shown position for eccentric 128. Also, between points 139 and 140, the effective radius between point 127 and the eccentric 128 center becomes shortened, thus increasing the velocity of the valve 121 in moving outward to increase the opening for the flow of gas or air to the ports 42. In this manner, the line 139—140′ is realized in Figs. 3 and 4.

In Fig. 7, line 150 depicts the displacement path of the valves 121—122 against time or the angular position of the eccentric 128 or the cranks 39 and 52. The height 124—125 depicts the masking effect at the inner edges of the valves and between their ears. At point 148, masking occurs and air is trapped in the ports 42 and in the masked volume. As the valves move in to point 151, the air or gas is compressed providing, as is the case, piston 37 is covering ports 42. At, or soon after, point 151, the head of piston 50 uncovers ports 54 and the head of piston 37 uncovers ports 42 at points 135—136, Figs. 3 and 4.

Fig. 8 is a pressure-volume diagram similar to Fig. 5 but on an enlarged scale, and illustrates only the toe-portion of the pressure curve 145—146. Points 148, 151, 135—136, 139, and 140 have been projected down from Fig. 7 on to Fig. 8, the latter figure including a showing of the piston 37 at the instant the upper ring thereof is uncovering the inlet ports 42. Point 148 marks the point where, in inward movement of the valves 121 and 122, those valves, the shoulders 124 and 125, and the overlapping ears co-operate to seal the ports 42 against communication with the air box 43. At this time, the inlet ports 42 are still covered by the piston 37, and air trapped by the closing valves is compressed, its pressure rising as along the line 152 (Fig. 8) to the point 151 at the end of the inward movement of the valves. If now, the piston stopped between points 148 and 151 and the valve mechanism continued to operate, the pressure between the valves 121—122 and in the port-belt would return to that in the air-box along line 154. However, when the top-ring on the piston 37 uncovers the ports 42, as shown, a narrow clearance passage around the piston nose becomes available through which some of the trapped and compressed air in the ports 42 can flow into the cylinder and the pressure in the ports 42 and between the valves 121—122 drops along the line 153 to join the expansion-blow-down line 146—136—139. The flow of the trapped air toward the working cylinder past the nose of the piston will carry gummy and carbonaceous oil away from the ports, thus keeping the ports free from such deposits. After the pressure in the trapped air and the cylinder is equalized along line 146—136—139, the flow is, generally, into the cylinder from the trapped volume carrying oil that may have been cut from the film on the piston to the inner faces of the port bridges to serve its proper purpose during the return stroke of the piston.

As will be apparent from the above, it becomes possible to obtain a total transfer period of less than 120° in a high-output, high-speed, two-stroke cycle engine. In an actual design for an engine, it has been found possible to have the following porting and other events:

Exhaust open_____ 52.5 degrees before O. D. C.
Inlet open_____ 28 degrees before O. D. C.
Exhaust close_____ 52.5 degrees after O. D. C.
Inlet close_____ 52.5 degrees after O. D. C.
Transfer period_____ 105 degrees, total.
Exhaust event_____ 105 degrees, total.
Blow-down event_____ 24.5 degrees, total.
Inlet event_____ 77.0 degrees, total.
Compression and expansion=0.84 stroke.
Expansion plus blow-down=0.95 stroke.

Of course these values are possible because of the high scavenging efficiency disclosed in my previous application of October 6, 1950, Serial No. 188,810.

The principal advantage of my invention is the increased work area represented by the cross-hatched portion of Fig. 5. That area represents a gain of four to five per cent over the conventional two-stroke cycle engine, bringing the total work obtainable within about three per cent of that in a four-stroke engine cylinder. Since the same amount of fuel will be required in all three engines to effect the same peak pressure, it is apparent that the cylinder efficiency of my engine will lie between that of the conventional two-stroke cycle and four-stroke cycle engines. This advantage, together with reductions in carbon accumulation at the inlet ports and reduced oil consumption, will attend the use of my invention in two-stroke cycle engines of any type. In a diesel engine embodying two opposed pistons in each cylinder, the invention has the additional advantage of permitting the two pistons to operate in phase, thus simplifying the balancing problem.

I claim as my invention:

1. In a two-stroke cycle engine having a cylinder provided with inlet ports positioned to be uncovered by a piston near the crank-end of its stroke, said inlet ports normally communicating with a supply of gas under pressure, and means operable during the power stroke of the piston and while the ports are covered by the piston for sealing said ports from communication with said source, for compressing the gas within the ports, and for maintaining such gas compressed until the piston uncovers the ports, said means being operative subsequently and while the ports are still uncovered to restore communication between the ports and said source.

2. The invention of claim 1 with the addition of a chamber through which the ports communicate with said source, said means comprising a valve member reciprocable into and out of said chamber.

3. The invention of claim 2 with the addition of valve-reciprocating means operative to move the valve out of the chamber at a rate greater than that at which it moves the valve into the chamber.

4. The invention of claim 1 with the addition that said ports are arranged in an annular series in the wall of the cylinder, said cylinder wall having an exterior annular groove communicating with said ports and with said source and having parallel walls spaced apart axially of the cylinder, said means comprising a pair of generally semi-circular valve members insertable into said groove from opposite sides of the cylinder, guides supporting said members for reciprocation radially of the cylinder into and out of the groove, and mechanism for reciprocating the members in said guides, said members having end portions which lap each other in sealing relationship as the members move into the groove.

5. The invention set forth in claim 4 with the addition that said mechanism operates to move the members out of the groove at a rate greater than that at which it moves the members into the groove.

6. The invention of claim 4 with the addition that said mechanism includes a lever connected to each member and swingable in a first direction to move its associated member into the groove and in a second and opposite direction to move its associated member out of the groove, a shaft for each lever, means for rotating the shaft through one complete revolution for each complete reciprocation of said piston, and means operative during a minor portion of each shaft-revolution for swinging said lever in the second direction and during the remaining and major portion of the shaft-revolution for swinging the lever in the first direction.

7. The invention set forth in claim 1 with the addition that said engine is of the opposed piston type and embodies means operatively interconnecting the pistons for reciprocation substantially in phase with each other.

References Cited in the file of this patent

UNITED STATES PATENTS

| 1,273,229 | Hurlbrink | July 23, 1918 |
| 1,781,194 | Riehm | Nov. 11, 1930 |

FOREIGN PATENTS

| 453,740 | Great Britain | Sept. 17, 1936 |
| 226,301 | Switzerland | July 1, 1943 |